US007054337B2

(12) United States Patent
Jackson, III

(10) Patent No.: US 7,054,337 B2
(45) Date of Patent: May 30, 2006

(54) METHOD AND APPARATUS FOR OPTIMIZING COMMUNICATIONS IN A MULTIPLEXER NETWORK

(75) Inventor: Alfred Russell Jackson, III, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 980 days.

(21) Appl. No.: 10/099,575

(22) Filed: Mar. 15, 2002

(65) Prior Publication Data

US 2003/0174738 A1 Sep. 18, 2003

(51) Int. Cl.
*H04J 3/04* (2006.01)
(52) U.S. Cl. .......................................... 370/535; 700/11
(58) Field of Classification Search ................ None
See application file for complete search history.

(56) References Cited

U.S. PATENT DOCUMENTS

| 4,156,798 | A | * | 5/1979 | Doelz ............................ 700/4 |
| 5,434,774 | A | | 7/1995 | Seberger | |
| 5,664,091 | A | | 9/1997 | Keen | |
| 5,995,916 | A | * | 11/1999 | Nixon et al. ................. 702/182 |
| 6,018,516 | A | | 1/2000 | Packer | |
| 6,192,281 | B1 | | 2/2001 | Brown et al. | |
| 6,405,337 | B1 | | 6/2002 | Grohn et al. | |
| 2002/0013629 | A1 | * | 1/2002 | Nixon et al. ..................... 700/4 |

FOREIGN PATENT DOCUMENTS

WO WO 00/79721 A2 12/2000

OTHER PUBLICATIONS

International Search Report for PCT/US/03/00916 dated Jun. 24, 2003.

* cited by examiner

*Primary Examiner*—Duc Ho
(74) *Attorney, Agent, or Firm*—Marshall, Gerstein & Borun LLP

(57) ABSTRACT

An apparatus for optimizing multiplexer communications in a system having a host, a multiplexer, and a field instrument device. The host is arranged to run a host software and to transmit a message to the multiplexer, the message including an embedded message for the instrument device. The host re-transmits the message until a response to the message is received from the device via the multiplexer, with the first re-transmission occurring after a long delay and a second and all subsequent re-transmissions occurring after a second time interval. An optimizing controller is arranged to establish a count indicating the number of re-transmissions occurring before the response has been communicated to the host, assess a message turnaround time based on the communication time it takes to transmit the message from the host to the multiplexer and to transmit the response from the multiplexer to the host, establish a bracket width at least as long as the message turnaround time, establish a short delay, and vary at least one of the long delay and the short delay to minimize the count.

32 Claims, 10 Drawing Sheets

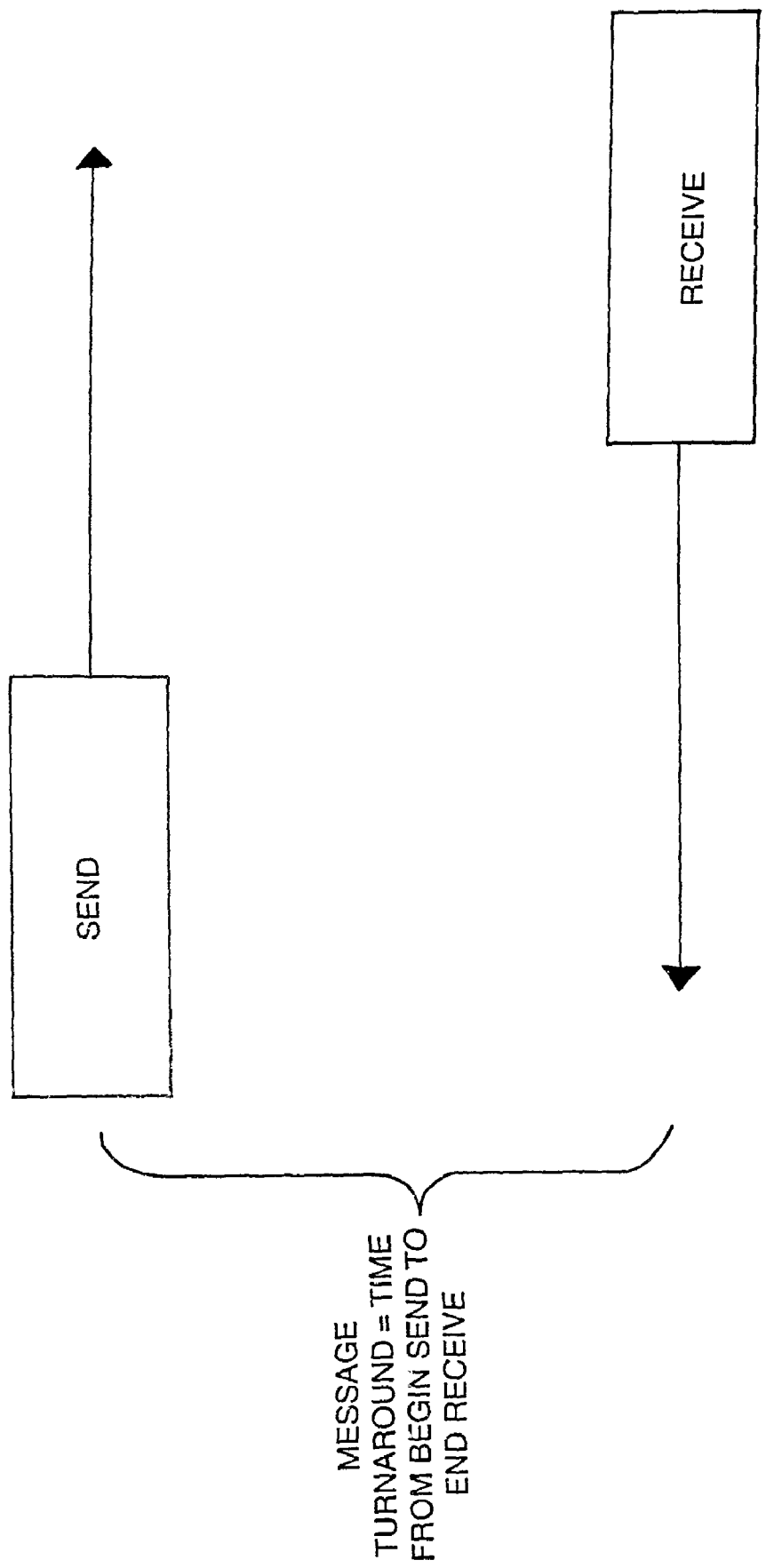

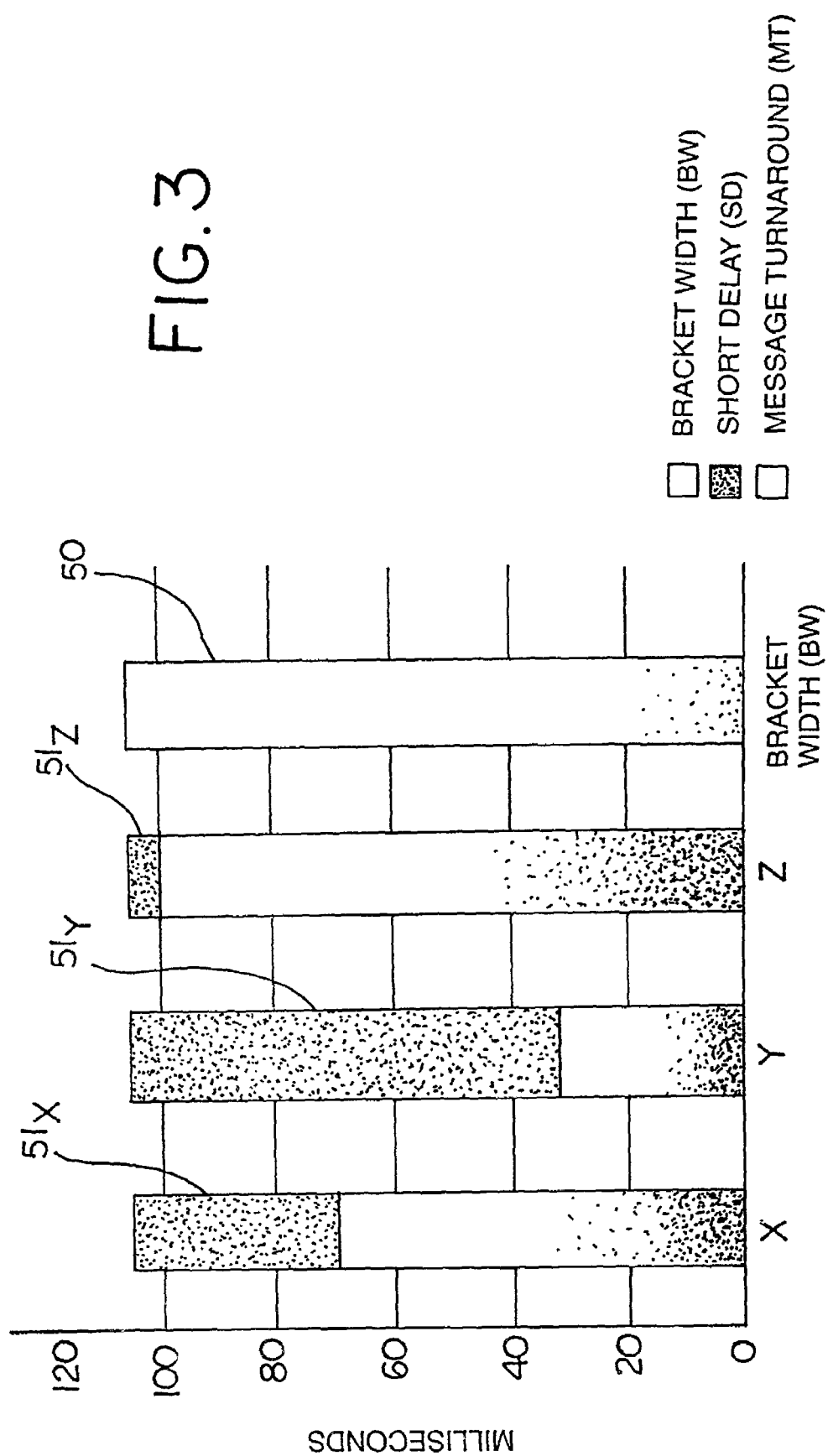

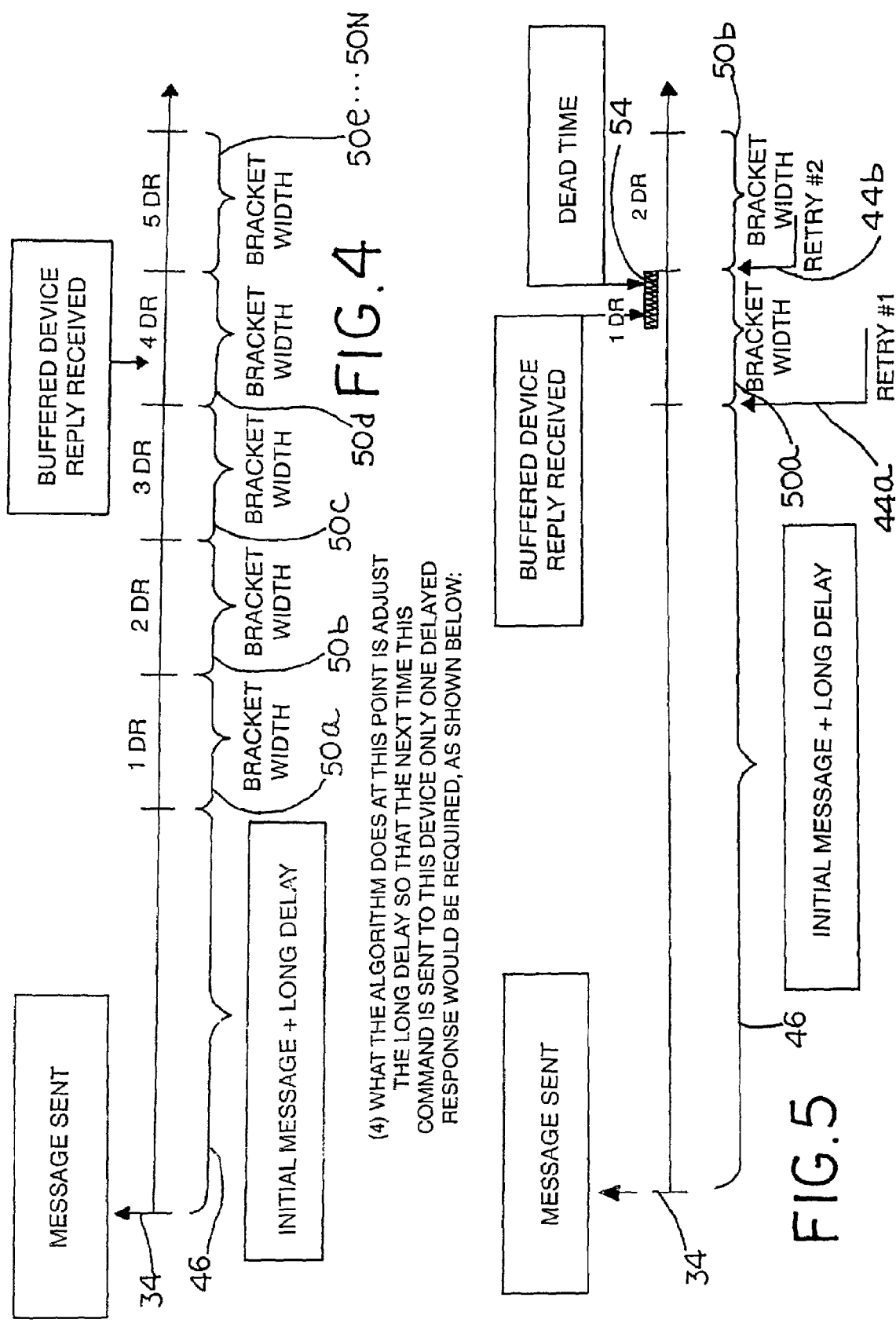

METHOD AND APPARATUS FOR OPTIMIZING COMMUNICATIONS IN A MULTIPLEXER NETWORK

FIELD OF THE INVENTION

The present invention relates generally to a system having a host controller communicating with one or more field instrument devices such as a valve or sensor through a multiplexer network and, more specifically, to a method and apparatus for managing and optimizing the communications through the multiplexer.

BACKGROUND OF THE INVENTION

Large processes such as chemical, petroleum, and other manufacturing and refining processes include numerous field devices disposed at various locations to measure and control parameters of a process to thereby effect control of the process. Similarly, in such industrial processes a number of valves, sensors or other field instruments or devices may be disposed throughout the process, each of which may require periodic diagnostic operations, configuration, and or calibration. These field devices may be, for example, sensors such as temperature, pressure, and flow rate sensors as well as control elements such as valves and switches. Historically, the process control, diagnostics, configuration, and/or calibration operations in such industrial processes relied on manual operations for reading level and pressure gauges, turning valve wheels, etc. Eventually, the use of local pneumatic control became more prevalent, in which local pneumatic controllers, transmitters, and valve positioners were placed at various locations within a process plant to effect control of certain plant locations. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and often complex control scheme to effect measurement and control of devices within the process to thereby control process parameters according to some overall control scheme. The same basic system is also applicant to the above-mentioned diagnostics, configuration, and calibration operations.

In such systems, a host controller provides a variable DC control current signal of between 4 and 20 milliAmps (mA) over a two-wire communication link to the transducer or positioner or to any other controllable device or instrument. The control current level changes the state of the controllable device in proportion to the strength of the variable DC current signal. For example, a valve positioner might fully open a valve in response to a 4 mA control current, and fully close the valve in response to a 20 mA control current.

In addition to being responsive to a variable control signal, current to pressure transducers, valve positioners, or other field instruments or devices have variable parameters which may be adjusted to control the operating characteristics of such devices. Previously, these devices or process instruments were adjusted manually. However, with the advent of so-called "smart" devices capable of bi-directional communication, it has become possible for necessary adjustments, readings, etc. to be carried out automatically from a location remote from the device or field instrument. Moreover, diagnostic testing and instrument monitoring can also be conducted from a remote location. However, a mechanism must be provided for transmitting a communication signal from the communication site to the field instrument or other device in order to implement the adjustments and/or the field testing.

For a variety of reasons, it may not be feasible to install a communication network separate and independent from the two-wire control loop that interconnects the communication site with the field instrument. Thus, it is desirable to transmit the communication signal over the two-wire control loop together with the 4–20 mA control signal so that additional wiring and/or a separate communication system will not be required. Thus, a modulated digital communications signal is superimposed on the 4–20 mA DC analog control signal used to control the field instrument in order to allow serial communication of data bitstreams between the field instrument and the host controller.

In such systems, the host controller communicates with one or more field instruments or devices via a multiplexer. Typically, the system will utilize any one of a number of available standard, open communication protocols including, for example, the HART®, PROFIBUS®, WORLD-FIP®, Device-Net®, and CAN protocols, which enable field devices made by different manufacturers to be used together within the same communication network. In fact, any field device that conforms to one of these protocols can be used within a process to communicate with and/or to be controlled by a DCS controller or other controller that supports the protocol, even if that field device is made by a different manufacturer than the manufacturer of the DCS controller.

As is known, communications between the host controller and the multiplexer are relatively fast, while communications between the field instrument or device are relatively slow. For a variety of reasons, the host controller desires to know the status of messages that have been sent to the field instrument or device via the multiplexer. However, repeated communications with the multiplexer regarding the status of the message sent to the field instrument or device impede the performance of other communications that must be sent through the multiplexer network.

BRIEF DESCRIPTION OF THE DRAWINGS

FIG. 2 is a diagram illustrating the message turnaround time and its relationship to the time it takes to send and receive a message;

FIG. 3 is a diagrammatic representation illustrating the establishment of a bracket width based on an assessment of three possible messages in a group of messages;

FIG. 4 is a time line illustrating the sending of a message from the host controller along with a number of periodic samplings or re-transmissions commencing after the expiration of a long delay period with the re-transmissions being spaced in time according to a bracket width time period;

FIG. 5 is a time line similar to FIG. 4 but illustrating the long delay period lengthened such that the message is received from the multiplexer buffer after a second re-transmission;

DETAILED DESCRIPTION OF THE PREFERRED EMBODIMENT

The embodiments described herein are not intended to be exhaustive or to limit the scope of the invention to the precise form or forms disclosed. Instead, the following embodiments have been described in order to best explain the principles of the invention and to enable others skilled in the art to follow its teachings.

Figure 1:
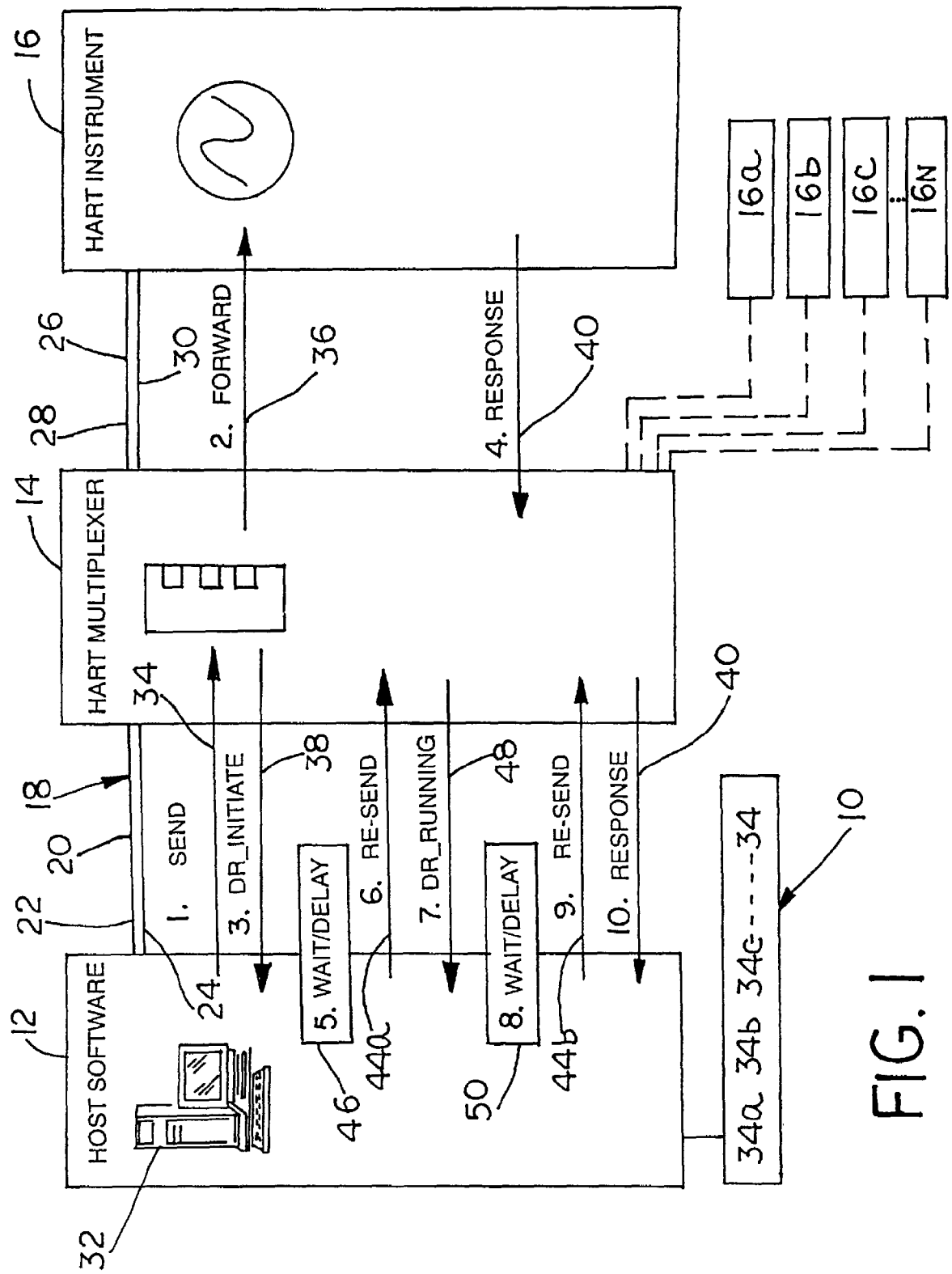
FIG. 1 is a schematic diagram of a system having a host controller, a HART multiplexer, and a HART field instrument device.

Referring now to FIGS. 1 and 9–11 of the drawings, a host system 10 is shown and includes a host controller 12, a multiplexer 14, and a field instrument or other device, hereinafter collectively referred to as the device 16. The host controller 12 is in operative communication with the device 16 through a communications system 18. The communications system 18 includes a two-wire control loop 20 having a first wire 22 and a second wire 24 extending between the host controller 12 and the multiplexer 14. Other known communication arrangements between the host controller 12 and the multiplexer 14 may be provided. The communications system 18 also includes a two-wire control loop 26 having a first wire 28 and a second wire 30 extending between the multiplexer 14 and the device 16. In the disclosed example, communications between the host controller 12 and the multiplexer 14 along the control loop 20 are significantly faster than are the communications between the multiplexer 14 and the device 16 along the two-wire control loop 26. More specifically, the two-wire control loop 20 may support communications in the range of 9600, 19,200, or 38,400 baud, while communications along the two-wire control loop 26 may be limited to about, for example, 1200 baud. Other communication rates may be contemplated. As would be known, the two-wire control loop 26 utilizes a variable DC control current signal of between 4 and 20 mA over the two-wire link to the device 16. Although only a single device 16 is shown, it will be understood that the host system 10 may include additional devices (e.g., devices 16a, 16b, 16c, . . . 16n (FIG. 1).

The host controller 12 is arranged to run a host software 32. The host software 32 is arranged to forward a message 34 into the communications system 18, with the message 34 including an embedded message 36. As would be known, the embedded message 36 is ultimately intended for communication to the device 16.

After the host controller 12 sends the message 34 to the multiplexer 14, the multiplexer 14 strips the embedded message 36 from the message 34 and forwards the embedded message 36 along the control loop 26 to the device 16. In a preferred form, the host system 10 will be arranged to operate according to the Highway Addressable Remote Transducer (hereinafter "HART") standardized protocol. Other communications protocols may be used.

As part of the HART specification, the multiplexer 14 must respond to the message 34 received from the host controller 12, and thus the multiplexer 14 will send a reply 38 to the host controller after the message 34 is received by the multiplexer 14 from the host controller 12. The reply 38, will, in accordance with the disclosed example, indicate to the host controller 12 that the message 34 has been received by the multiplexer 14, and that the multiplexer 14 has forwarded the embedded message 36 to the device 16.

As outlined above, the communication rate between the host controller 12 and the multiplexer 14 typically is significantly faster than the communication rate between the multiplexer 14 and the device 16. Accordingly, the host controller 12 may receive the reply 38 from the multiplexer 14 before the device 16 receives the embedded message 36. Further, because the communication rate on the two-wire control loop 26 is relatively slow, a relatively significant period of time will pass before a response 40 is sent to the multiplexer 14 from the device 16. It will be understood that the response 40 sent by the device 16 to the multiplexer 14 will be sent after the device 16 has received the message 36 and processed the message 36.

The multiplexer 14 preferably includes a buffer 42 which receives and saves the response 40 from the device 16. Preferably, the response 40 will be stored in the buffer 42 until the response 40 is retrieved or otherwise communicated to the host controller 12. Other mechanisms for receiving, storing and communicating the response 40 to the host controller 12 may be contemplated. It will be understood that in certain circumstances the response 40 stored in the buffer 42 may be canceled by another and different message from the host controller 12.

Once the reply 38 is communicated between the multiplexer 14 and the host controller 12, the host controller 12 is free to resend the message 34 at any time. However, if an immediate retry is attempted, it is virtually guaranteed that the response 40 from the device 16 has not yet been received by the multiplexer 14 due to the relative slowness of the two-wire communication loop 26 between the device 16 and the multiplexer 14. Accordingly, the host controller 12, as directed by the host software 32, will not retry or resend the message 34 until after the expiration of a predetermined and fixed time period. This first fixed time period between the initial sending of the message 34 and a first resend 44 of the message 34 is termed a "long delay" 46. Upon the expiration of the long delay 46, the host controller 12 will attempt the first resend 44a of the message 34 in an attempt to retrieve the response 40 from the buffer 42 from the multiplexer 14. However, if the response 40 has not yet been received by the multiplexer 14 from the device 16, the multiplexer 14 may send a message 48 to the host controller 12 indicating that the embedded message 36 has been forwarded to the device 16 by the multiplexer 14 and that the multiplexer 14 is still waiting to receive the response 40 from the device 16. It will be understood that a message 48 will be sent to the host controller 12 after each re-send 44 (44a, 44b, 44c, etc.) until the response 40 is present tin the buffer 42.

After the host controller 12 has received the message 48, the host controller 12 will enter another waiting period. However, because the response 40 is expected relatively soon, this additional waiting period is short relative to the earlier long delay 46, and thus this subsequent waiting period is indicated by a shorter time period termed a short delay 51. Upon expiration of the short delay 51, the host controller 12 will attempt a second resend 44b of the message 34. The host controller 12, as directed by the host software 32, will engage in an ongoing cycle of waiting the bracket width 50 (e.g., 50a, 50b, 50c, . . . 50n), followed by a resend 44 of the message 34 until a valid response 40 is received from the multiplexer 14. In the alternative, the re-sends 44a, 44b, 44c, . . . 44n may cease upon receipt by the multiplexer 14 of an error code from the device 16. Stated another way, the host controller 12 may vary the duration of the short delay 51 based on the size of the message in such a manner that the bracket width 50 remains consistent. As a further alternative, the ongoing cycle may be interrupted upon the expiration of a predetermined time-out period. Thus, the host controller 12 will initiate a plurality of resends 44a, 44b, 44c . . . 44n, with the first resend occurring after the expiration of the long delay 46. The second resend 44b will occur after the expiration of the first bracket width 50a, with all subsequent resends, if necessary, occurring upon the expiration of the subsequent bracket widths 50b, 50c, 50d . . . 50n.

The use of fixed time periods for the long delay 46 and the short delay 51 may yield satisfactory communications performance in certain applications, although certain additional improvements in the areas of throughput and efficiency may be desirable. However, there may be some shortcomings in the use of fixed period delays. For example, a message intended for the device 16 may contain a message number and data unique particular to that message. Further, there may be in excess of several dozen different unique messages (e.g., 34a, 34b, 34c, . . . 34n), with varying amounts of data contained in each unique message. Moreover, each unique message may have a different appropriate response from the device 16. Sometimes the data that is received in the response can vary in length for the same unique message. The size of the messages (e.g., the size of the message being sent as well as the size of the response) determines the total transmission time for the message, which accounts for over 90% of the time it takes to complete a message with (e.g., receive a response from) the device 16.

Because there is a wide variance in the size of messages sent and received, a fixed time period for the long delay 46 may result in inefficiencies in communications performance in certain applications. If the long delay 46 is too long, the response 40 may sit in the buffer 42 of the multiplexer 14 waiting to be retrieved for an undesirably long and thus inefficient time period. On the other hand, if the long delay 46 is too short, an undue number of round trip communications between the host controller 12 and the multiplexer 14 may be required in order to retrieve the response 40.

Further, it is known that there may be slight variability in hardware performance from one device to another device, and from one multiplexer to another multiplexer. A fixed time period for the long delay 46 does not account for these slight variations in performance, nor will the use of a fixed time period for the long delay 46 allow for the host system 10 to make adjustments to account for these performance variations. Moreover, in certain applications the baud rate of the multiplexer 14 may be adjusted, which affects the time it takes to complete a message cycle. The use of a fixed time period for the long delay 46 does not take into account variations in the baud rate of the multiplexer 14.

Figure 9:
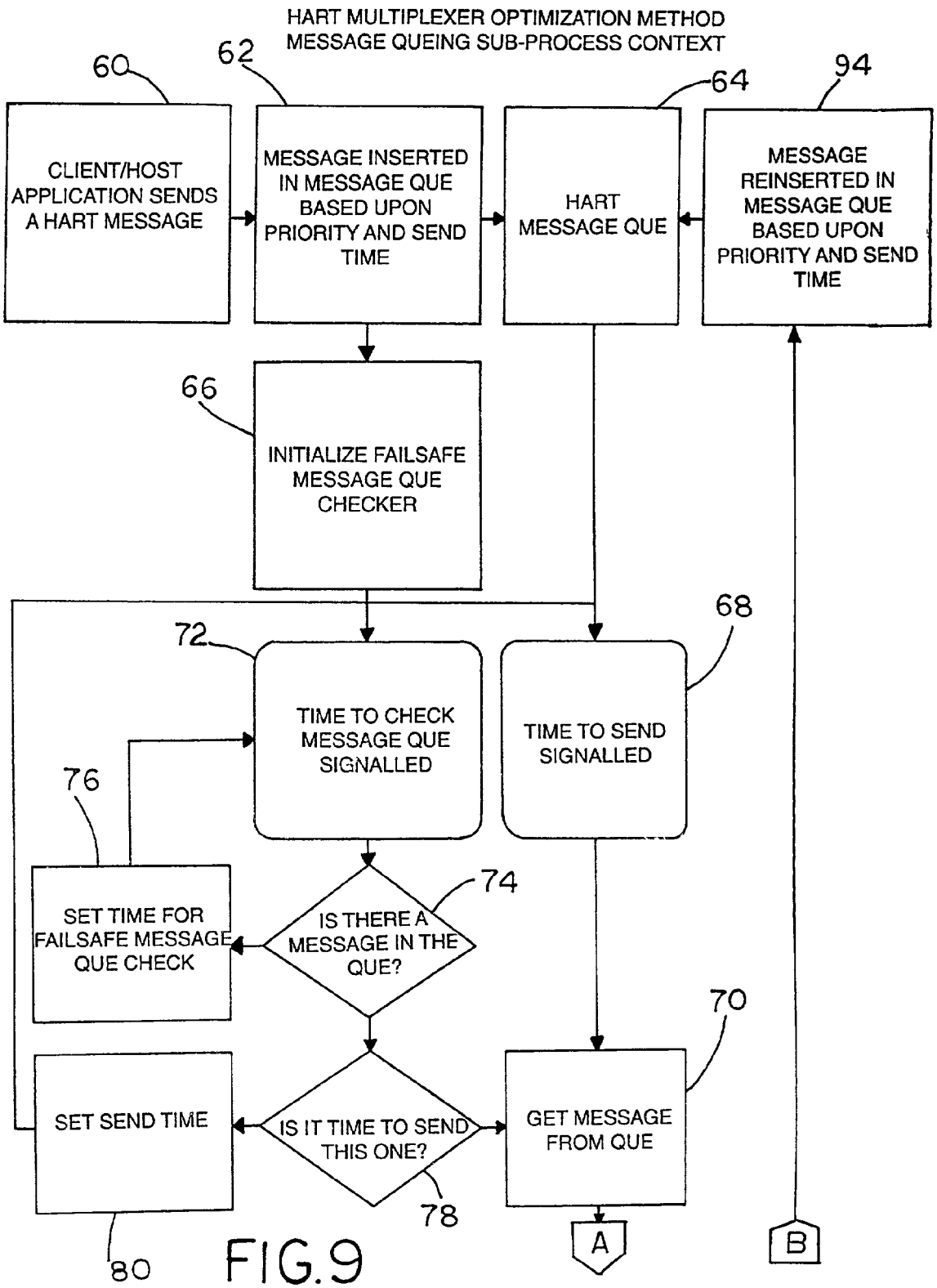
FIG. 9 through FIG. 11 contain a flow chart of an optimization program that can be implemented by the host controller of FIG. 1.
Figure 10:
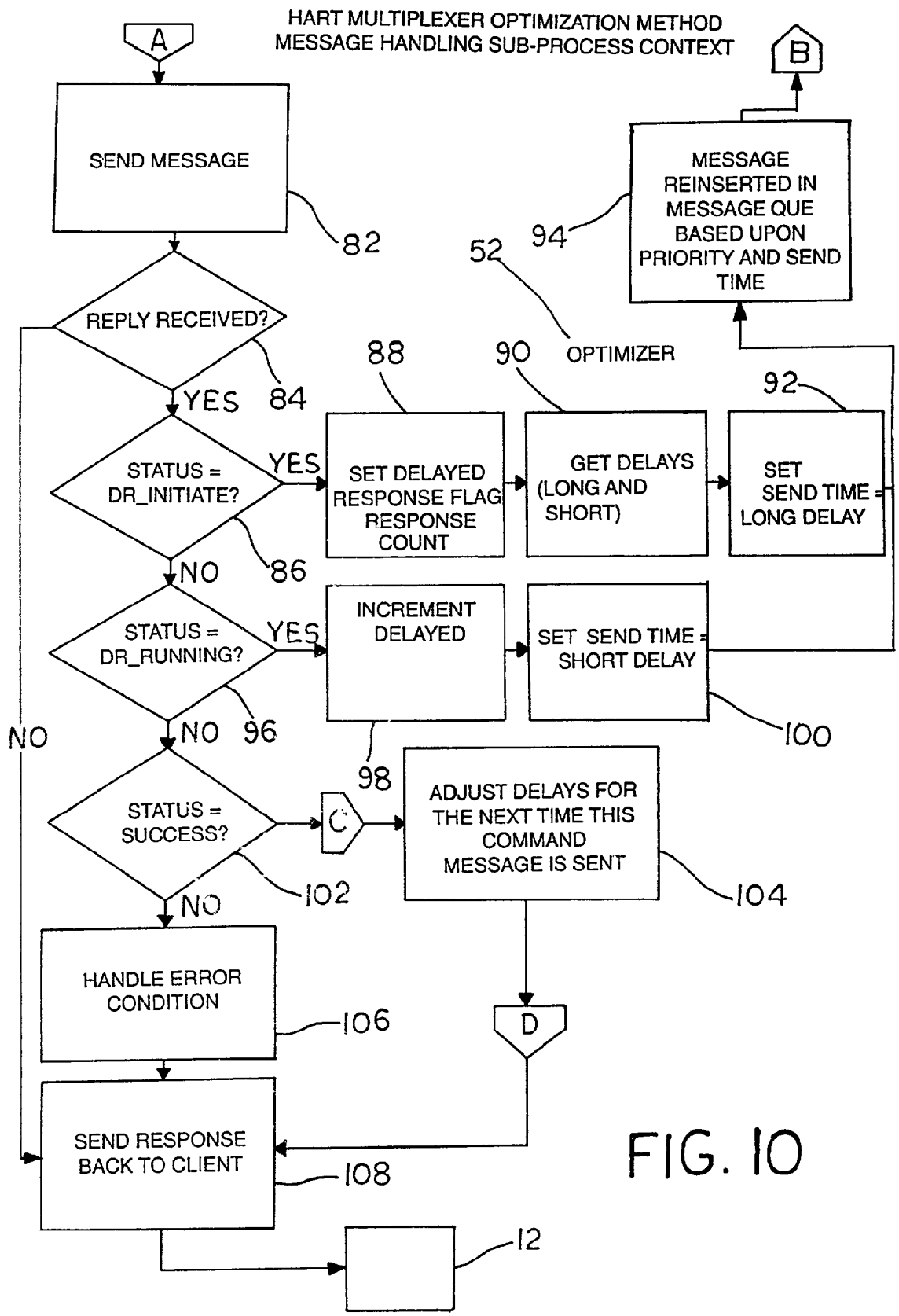
Figure 11:
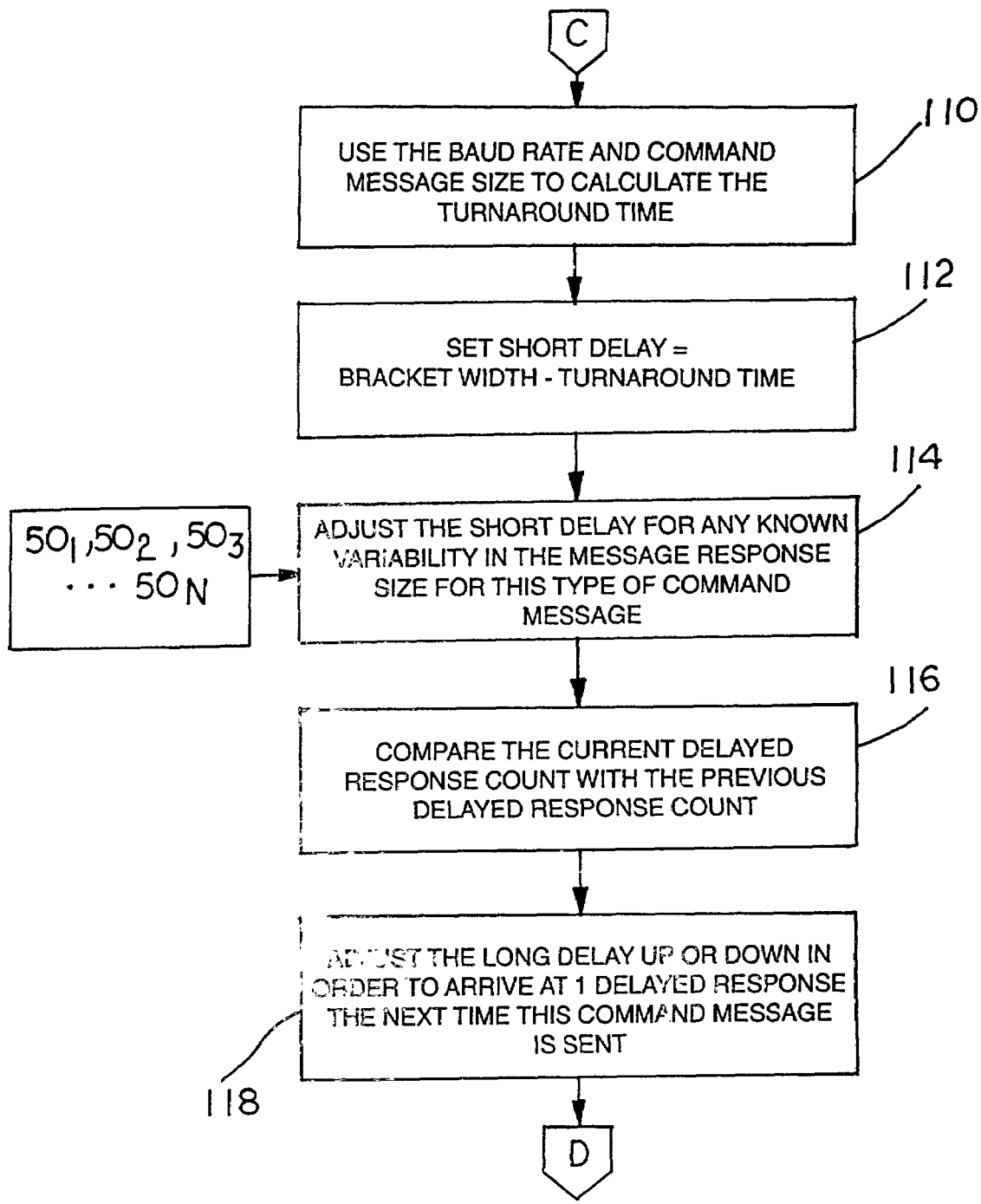

Accordingly, the host controller 12 is arranged to perform an optimization cycle 52, which is shown schematically in FIGS. 9 through 11. According to the disclosed example, the optimization cycle 52 allows the host software 32 to, according to the disclosed example, maximize communication throughput and efficiency when communicating with the device 16 (or with a number of individual devices 16) on a multiplexer network.

The optimization cycle 52, according to the disclosed example, adjusts the long delay 46 and/or the short delay 51 in order to retrieve the response 40 from the buffer 42 of the multiplexer 14. These adjustments in the long delay 46 and/or the short delay 51 may be made unique to each multiplexer 14/device 16/message 34 combination. The adjustments may be based on, for example, the number of re-sends (44a, 44b, 44c, etc.) that were required the previous time that particular unique message 34 was sent to that particular device 16, or upon any other unique historical data.

In order to gain a more thorough understanding of the optimization cycle 52, the following terms and concepts that apply to the underlying algorithm will hereinafter be described.

(1) Message Turnaround Time (MT)—This is the transmission time required (based on the relevant baud rates, for example) for the host controller 12 to send the message 34 and receive the response 40 from the multiplexer 14. For example, the host controller 12 may send a particular message X that is 28 bytes long to the multiplexer at 9600 baud. The multiplexer may respond almost immediately (within about 2 byte times) with a reply message that is 30 bytes long. Based on the applicable baud rate and messages sizes, it takes approximately 70 milliseconds to complete this round-trip message for the message X.

After the host controller 12 sends a message to the multiplexer 14, the host controller 12 preferably will not send another message (e.g., a re-send) until the host controller 12 either receives a response or a hardware timeout occurs. Therefore, the MT is the shortest time interval between outgoing messages from the host controller 12 for a particular command or message. MT is calculated at send time based upon the size of the outgoing command message and the anticipated size of the response.

(2) Bracket Width (BW)—The Bracket Width is the Message Turnaround time (MT) corrected for message length variability. For example, a command or message X, as described previously, may have an MT of 70 milliseconds. A command or message Y, however, with less content may have an MT of only 30 milliseconds. Further, a command or message Z, with more message content, may have an MT of 100 milliseconds. Thus, the BW will preferably be set to a value greater than or equal to the largest MT for the messages X, Y, and Z, sent to a particular instrument or device 16. The BW provides for a known, fixed interval between message transmissions, corrects for message length variability, and provides a consistent baseline for adjustment of the value for the long delay 46 as will be outlined below.

When the response 40 is eventually obtained from the buffer 42 it is guaranteed that this retrieval occurred within a BW period of arriving in the buffer 42. For example, if the BW is 100 ms, when the response 40 is eventually retrieved from the buffer 42 it is guaranteed that the response 40 has been there no more than 100 milliseconds.

(3) Long Delay (46)—The Long Delay 46 is the amount of time that the host controller 12 will wait before resending a message to the multiplexer 14 after receiving the "DR_INITIATE" (the message 38) response code from the multiplexer 14. A Long Delay value is maintained for every command of every instrument that uses the multiplexer delayed response mechanism, with this historical data preferably being suitably stored. The time value of the long delay 46 is constantly updated and is central to the optimization algorithm as the adjustments to the long delay 46 are what allows the host controller 12/the host software 32 to optimize communications efficiency by obtaining the response 40 from the buffer 42 of the multiplexer 14 as soon as possible after the response 40 arrives in the buffer 42.

(4) Short Delay (51)—The Short Delay 51 is the amount of time added to the MT time needed to arrive at the Bracket Width 50. The short delay 51 is applied whenever a "DR_RUNNING" response code (the message 38 sent to the host controller 12 by the multiplexer indicating that the embedded message 36 has been forwarded to the device 16). The Short Delay 51 is calculated as follows:

Short Delay 51= Bracket Width−Message Turnaround;

Or, short delay 51= bracket width 50− MT

FIG. 3 illustrates the relationship between the Short Delay 51, the Message Turnaround time MT and the Bracket Width 50.

(5) Delayed Response Count (DR Cnt)—A Delayed Response Count 58 indicates the number of DR_RUNNING responses (e.g., the message 48) received by the host controller 12 from the multiplexer 14 before finally obtaining the device response 40 from the buffer 42 of the multiplexer 14 for a given command or message. This value is set to zero when the message 34 is first sent, and is incremented each time a "DR_RUNNING" response code (the message 48) is received from the multiplexer 14. This Delayed Response Count 58 is then used to adjust/calculate the Long Delay 46 that will be used the next time this same command is sent to this same device.

(6) Dead Time—The amount of time the response 40 sits in the buffer 42 waiting to be retrieved by the host controller 12.

Given this background, exemplary goals of the algorithm embodied on the optimization cycle 52 include:

(1) To obtain the message response from the multiplexer as soon as possible after it arrives there (minimizes Dead Time).

(2) To do so with as few message retries as possible.

In accordance with the disclosed example, the optimization cycle 52 works as follows: Prior to sending the message 34, the host software 32 calculates an initial value for the short delay 50. The initial value for the short delay 50 will be indicated by $50_1$, with all subsequent values for the short delay 50 indicated by $50_2, 50_3 \ldots 50_n$. The host software 32 also looks up a value for the long delay 46, with this initial value for the long delay 46 indicated by $46_1$. Again, all subsequent values for the long delay 46 will be indicated by $46_2, 46_3 \ldots 46_n$. See FIG. 6) The initial value $46_1$ may be an existing value that was computed the previous time that this particular message 34 was sent to this particular device 16. In the event that this is the first time that this particular command or message 34 has been sent to this particular device 16, the initial value $46_1$ may be calculated in much the same manner that the message turnaround time is calculated.

Referring to FIG. 4, when the message 34 has been sent from the host controller 12 to the multiplexer 14, and when the reply 38 has been received by the host controller 12, the host controller 12 will enter the waiting period indicated by the long delay 46, which in this case is the initial long delay $46_1$. After the expiration of the long delay $46_i$, the host controller 12 will initiate the first re-send 44a. In the event the response 40 is not yet in the buffer 42 of the multiplexer 14, the multiplexer 14 will send the message 48 indicating that the response 40 has not yet been received from the device 16. If necessary, the host software 32 will wait the short delay period 50 before re-sending another message, e.g., the re-send 44b. Upon the expiration of the first short delay period $50_1$, the host controller 12 will send the second re-send 44b. This process of re-sending the message followed by a short delay period will be continued until the response 40 is present in the buffer 42 of the multiplexer 14. As shown in FIG. 4, the response 40 is received at the buffer 42 during the fourth short delay period $50_4$, which occurs shortly after the fourth re-send 44d.

For a variety of reasons, it may be undesirable to have so many communications occurring between the host controller 12 and the multiplexer 14, as evidenced by the need for sending the initial message 38 and for re-sends 44a through 44b. Accordingly, in referring now to FIG. 5, the optimization cycle 52 involves adjusting the long delay 46. In this case, the long delay 46 will be indicated by the second long delay period $46_{ii}$. As shown in FIG. 5, the response 40 is present in the buffer 42 of the multiplexer 14 after one re-send 44a. However, the response 40 is not communicated to the host controller 12 until the occurrence of the second re-send 44b. The response 40 is communicated to the host controller 12 after the expiration of the initial short delay $50_i$. Note that the response 40 is present in the buffer 42 for a period of time prior to the second re-send 44b being sent, with this period of time being referred to as a "dead time" 54.

From a re-try count efficiency standpoint (the re-try count being indicated by the number of re-sends required 44a, 44b, etc.), it would seem more logical to attempt to retrieve the response 40 with no re-sends 44a, 44b, etc. Although this is possible, there is no guarantee how long the response 40 has been waiting in the buffer 42 to be retrieved. Ideally, the response 40 will be present in the buffer 42 with minimal dead time. However, if the initial value $46_1$ (or any of the subsequent values $46_2, 46_3$, etc.) for the long delay are sufficiently long, it can practically be guaranteed that the response 40 will be present in the buffer 42 upon the occurrence of the first re-send 44a. However, simply lengthening the long delay period 46 may result in a situation where the dead time 54 is unduly long, as the message response 40 may have been sitting in the buffer 42 for almost the entire long delay period 46, which would be a worst-case scenario. Such a situation may be exacerbated by volatile environmental conditions, such as having a secondary master or having the device in burst mode, which tends to cause significant increases in the long delay period.

Figure 6:
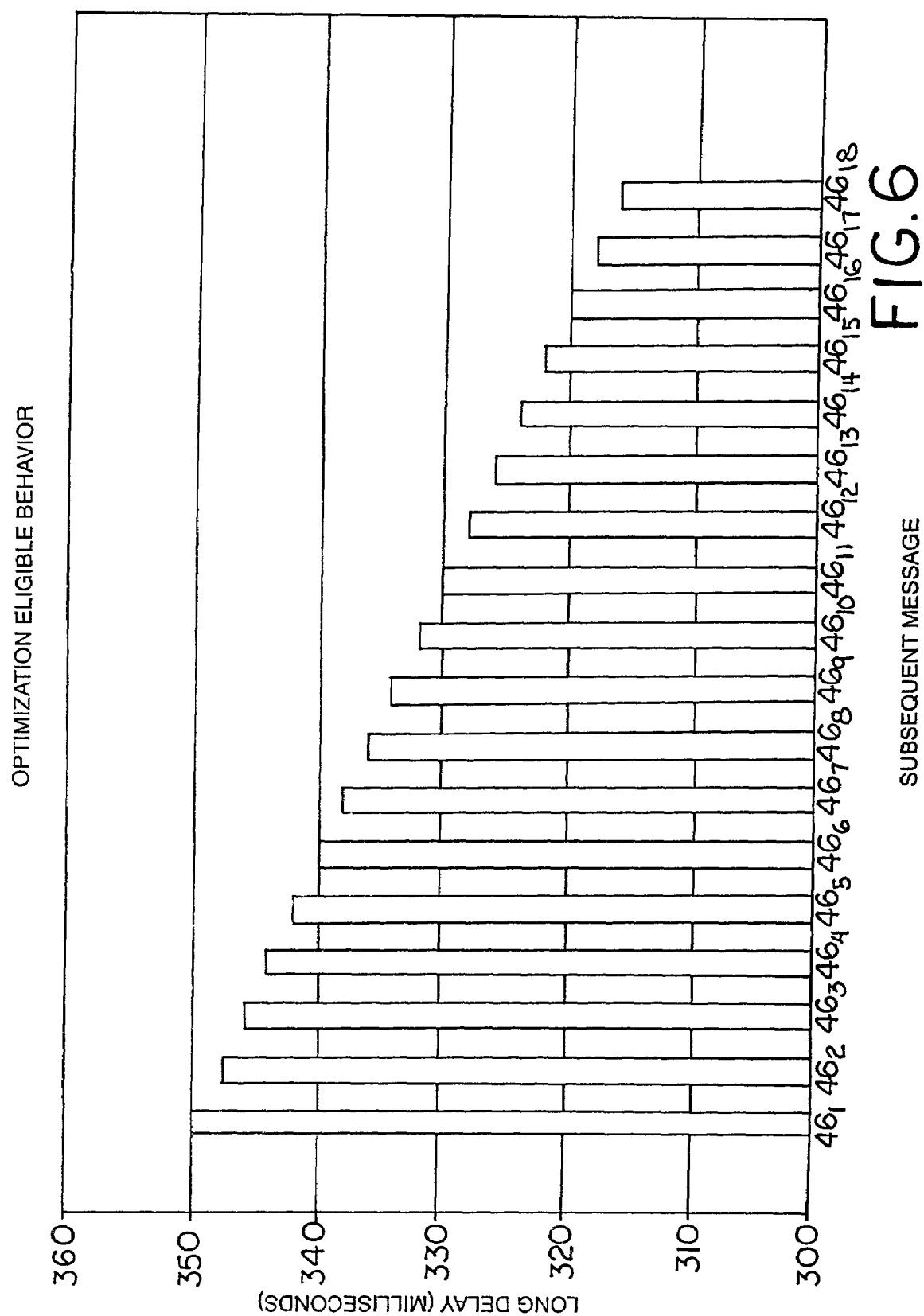
FIG. 6 is a graph illustrating one possible optimization scheme for implementation once the long delay time period has reached an optimization eligible state.

Referring now to FIG. 6, throughput and efficiency may be further maximized beyond simply lowering the number of delayed responses. Accordingly, the optimization cycle 52 will further optimize the long delay 46 in order to minimize dead time 54. Once the long delay 46 has been set at a value that results in the response 40 being present in the buffer 42 upon the first re-send 44a, the long delay 46 becomes optimization-eligible. Once the long delay 46 is optimization eligible, the optimization cycle 52 searches for an optimization fail-point 56. The optimization fail-point is found by continuously shortening the long delay 46 over time, as shown in FIG. 6. As the long delay 46 is shortened, eventually the long delay 46 will become sufficiently short that a second re-send 44b is required. This fail-point 56 is found by gradually reducing the long delay 46 on each successive message which causes the brackets indicated in FIG. 5 to gradually shift toward the left (for discussion purposes, the point at which the response 40 is received in the buffer 42 is assumed to be constant). As the brackets shown in FIG. 5 shift toward the left, the dead time 54 is gradually reduced. Preferably, each subsequent long delay period is slightly shorter than the preceding long delay period, with the interval shown in FIG. 6 being equal to approximately 2 milliseconds. Other intervals may be chosen by the user. However, according to the disclosed example the interval of approximately 2 milliseconds has yielded favorable experimental results.

Figure 7:
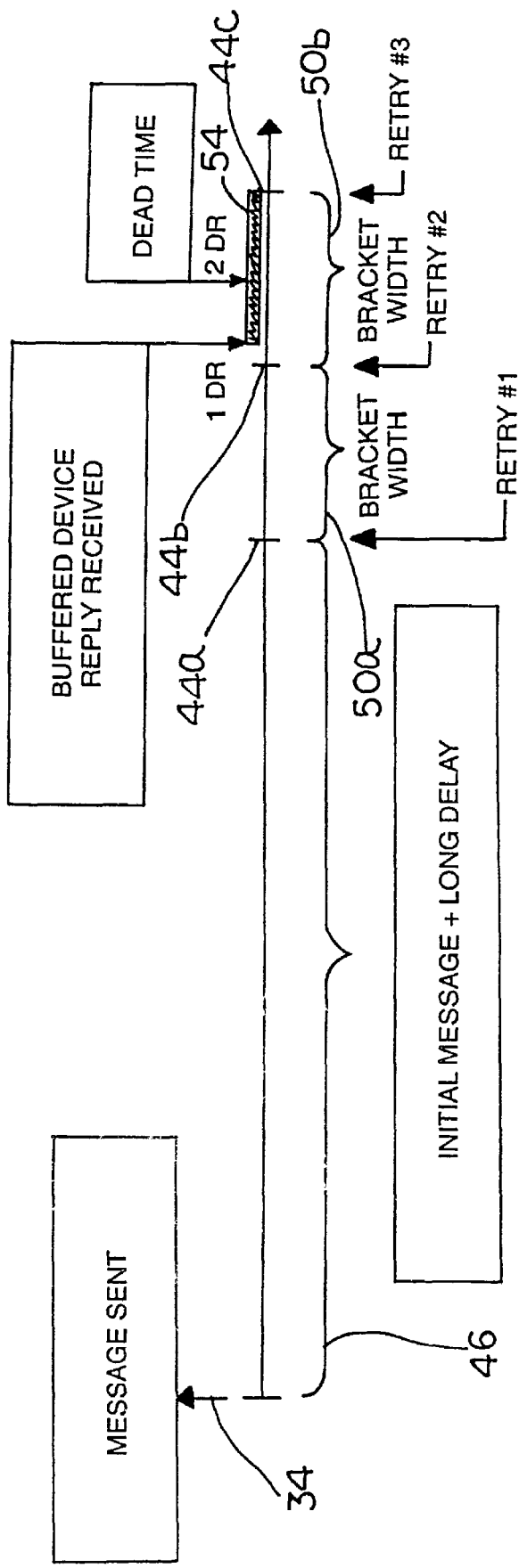
FIG. 7 is a time line similar to FIGS. 4 and 5 but illustrating how the long delay time period may be adjusted until a fail point is reached.

Referring now to FIG. 7, after the long delay 46 has been sufficiently shortened, it is evident that a second short delay 50 is required in order to retrieve the response 40 from the buffer 42, which response 40 is not retrieved until the third re-send 44c. This is an indication that the fail-point 56 has been reached.

Once the fail-point 56 has been calculated, the long delay 46 is increased by a pre-determined amount, which in the disclosed example is approximately 25% of the bracket width. Referring to either of FIG. 4, 5, or 7, it will be understood that increasing the long delay 46 will again shift the brackets toward the right when viewing the figures. This 25% increase in the long delay 46 will once again shift the long delay 46 back to an optimization-eligible state, at which point the long delay 46 will again enter the optimization cycle 52.

The optimization cycle 52 according to the disclosed example will account for the fact that the reply times for the exact same message are not actually constant. In actuality, the reply times may vary slightly, even in a stable environment, and will vary significantly in an unstable environment. Thus, the optimization cycle 52 will account for changing environmental conditions and enable the host system 10 to operate efficiently while minimizing the dead time 54. Because of the varying environmental conditions which affect the communication times, the fail-point 56 can never be established with absolute certainty. Accordingly, exactly when the response 40 is received by the buffer 42 within the initial short delay period 50i, can never be known with absolute certainty. However, the optimization cycle 52 provides a reasonable guarantee that all communications are actually completed within 25% or less of the fail-point 56. Ideally, the fail-point 56 would be indicative of zero dead time.

Figure 8:
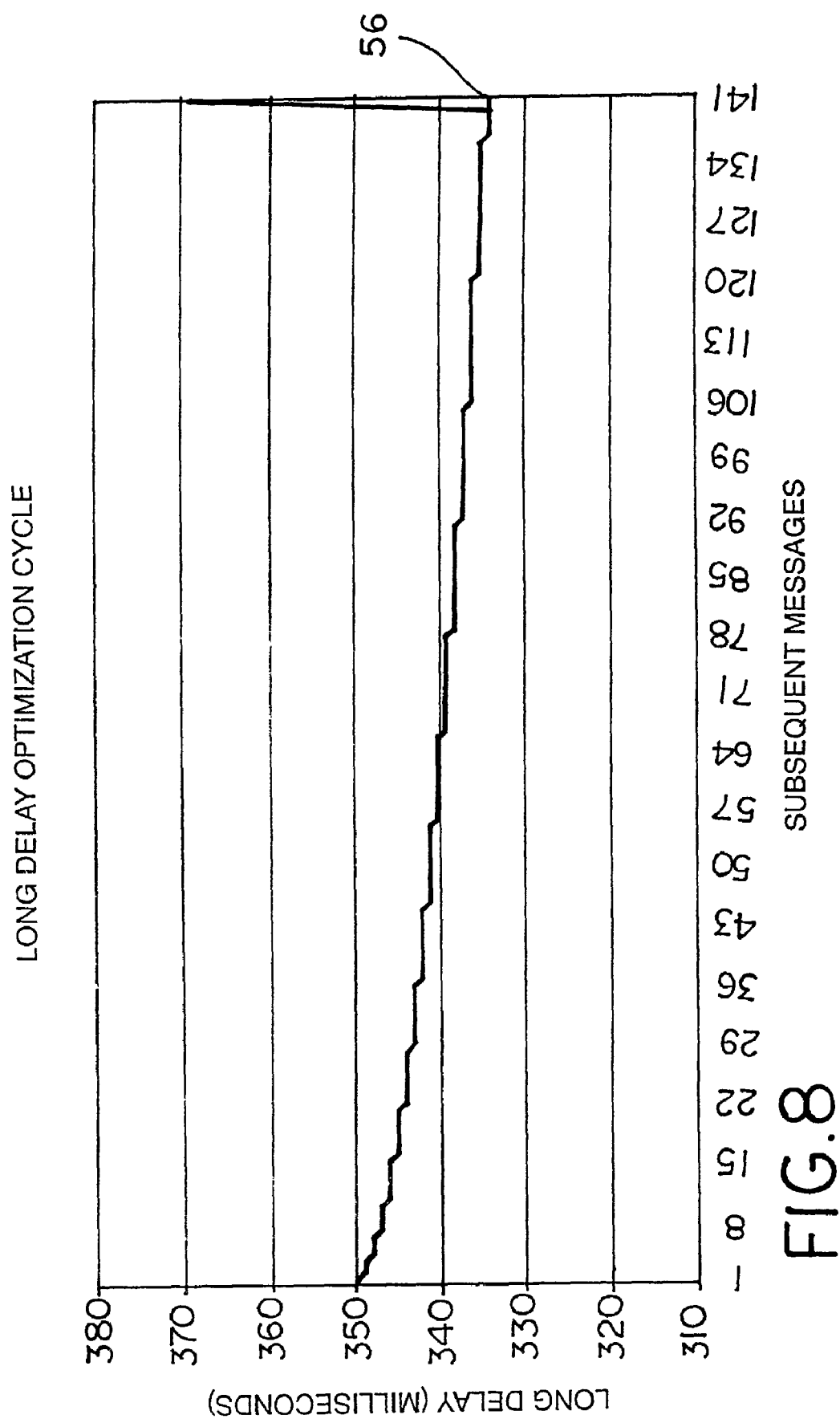
FIG. 8 is a graph illustrating a long delay optimization cycle proceeding to the fail point.

The optimization cycle 52 functions similarly to the optimization-eligible state in that the long delay 46 is reduced until the fail-point 56 is reached. However, the algorithm for reducing the long delay 46 is more logrithmic in nature. The closer the optimization cycle 52 gets to achieving a zero dead time (e.g., the closer the optimization cycle 52 gets to the fail-point 56), the optimization cycle 52 will send more messages in any given long delay period 46. As shown in FIG. 8, the long delay period 46 is adjusted downward relatively quickly early on in the optimization cycle 52. On the other hand, as the number of subsequent messages increases, the more subsequent messages will be sent using any particular long delay period 46. Stated in another way, as the optimization cycle 52 approaches the fail-point 56, more and more subsequent messages are sent for any given shortened long delay period 46. Thus, according to the disclosed algorithm, the optimization cycle 52 will seek to maximize the number of messages being sent with the long delay being set as close as possible to the fail point 56.

The transition from one to two delayed responses (e.g., the transition between requiring only a single re-send 44a and requiring at least a second re-send 44b) is expected during the operation of the optimization cycle 52. However, if zero re-sends are required, or if more than two re-sends are required, the optimization cycle 52 may be canceled, and a more significant correction to the long delay 46 may be applied in order to return the communication cycle to the status reflected in FIG. 5 in which only a second re-send 44b is required. Once this transpires, the optimization-eligible state is established and the search for the fail-point 56 begins again. Subsequently, the optimization cycle may be started again after the fail-point 56 has been established. According to the disclosed example, the optimization cycle 52 may constantly adjust to changing environmental conditions and "learns" how to communicate any particular unique command to any particular unique device in a manner that seeks to maximize efficiency.

Referring now to FIGS. 9–11, the system 10 according to the present invention may be further explained as follows. As shown in FIG. 9, the host system 10 initiates the sending of a message 34 at 60. At 62, the message 34 is inserted in a message queue 64 based upon the priority of the message and the send time of the message. Once the message 34 is in the HART message queue 64, the time to send the message is signaled at 68, after which the message 34 is obtained from the message queue at 70. The steps at 66, 72, 74, 76, 78 and 80 are optional and need not be performed in order to carry out the optimization cycle 52.

Proceeding now to block A of FIG. 10, the message 34 is sent at 82, after which a determination is made whether the reply 38 has been received at 84. If the reply 38 has been received, then the status is updated at 86 to reflect that the reply 38 has been received. At this point, the host software 32 runs the optimization cycle 52. The optimization cycle 52 sets the delayed response flag at 88 followed by obtaining the initial value for the long delay 46 and the short delay 51 at 90. The send time is then established at 92 to equal the long delay 46, after which the message is reinserted in the message queue based upon the priority and send time at 94 (FIGS. 9 and 10).

At 96 it is determined whether the status indicates that the delayed response count is still being counted. If the answer is "yes", then at 98 the delayed response count is incremented, and the send time is set to be equal to the short delay 51 at 100. This information is communicated to 94, for establishing the priority and send time. If the status of the DR running code is indicated as "no", then at 102 it is determined whether the status of the message is successful. If the answer is "yes", then at 104 the host controller 12 will adjust the long delay 46 and the short delay 51 and store this information for the next time that this unique message 34 is sent. If the answer to the status inquiry at 102 is "no", then at 106 an error condition is handled in an appropriate manner. Each of the determinations made at 84, 104, and 106 are then communicated at 108 back to the controller 12.

The output of the status determination at 102 is next communicated via block C in FIG. 10 to block C in FIG. 11. As shown in FIG. 11, the baud rate and message size are used at 110 in order to calculate the MT. Next, at 112, the short delay 51 is set to be equal to the bracket width (BW) minus the message turnaround time (MT). At 114, the short delay 51 is adjusted for any known variability in the message response size for this type of message (based on historical data for this particular message and/or any other historical data for the particular field of the unique field device for which the unique message is intended). At 116, the current delayed response count is compared with the previous delayed response count, and at 118 the long delay 46 is adjusted up or down as necessary in order to arrive at a delay response count of 1 the next time that this unique message is sent. It will be understood that the magnitude and direction of the adjustment depends on the difference between the delay response count and how far the current delay response count is from the target bracket. In the disclosed example, the target is a delay response count of 1. At block D this information is then communicated back to 108 for transmission to the host controller 12.

In accordance with the disclosed example, the HART multiplexer communications optimization cycle 52 allows the host software 32 run by the host controller 12 to retrieve responses 40 from the device 16 as soon as possible after the response 40 has arrived in the response buffer 42 of the multiplexer 14, with the dead time being, on average, in the neighborhood of about 6–10 milliseconds. This arrangement serves to seek additional efficiencies in communications performance over a multiplexer network.

Those skilled in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

What is claimed is:

1. An apparatus for optimizing multiplexer communications comprising:
    a host;
    a multiplexer; and
    an instrument device;
    the host arranged to run a host software and to send a first message and a plurality of subsequent messages to the multiplexer, each of the messages including an embedded message for the instrument device, the time period between the first message and a first subsequent message defining a long delay;
    the multiplexer arranged to strip the embedded message and to forward the embedded message to the instrument device, the multiplexer further arranged to send a response to the host, the response indicative of whether the embedded message has been forwarded to the multiplexer and whether a reply has been received from the instrument device, the multiplexer further arranged to receive and store the reply;
    the instrument device arranged to receive and process the embedded message and to send the reply to the multiplexer; and
    an optimizing controller operatively coupled to the host, the optimizing controller arranged to:
        communicate to the host whether the reply has been received by the multiplexer;
        establish a count, the count indicating the number of subsequent messages occurring before the reply has been received by the multiplexer;
        assess a message turnaround time, the message turnaround time based on the time it takes to transmit any one of the messages to the multiplexer and to receive the response from the multiplexer;
        establish a bracket width, the bracket width at least as long as the message turnaround time;
        establish a short delay based at least in part on the message turnaround time and the bracket width; and
        vary at least one of the long delay and the short delay to minimize the count.

2. The apparatus of claim 1, wherein the optimizing controller is arranged to vary both the long delay and the short delay to minimize the count.

3. The apparatus of claim 1, wherein the multiplexer includes a buffer for storing the reply until the response is communicated to the host, and wherein the optimizing controller is further arranged to vary at least one of the long delay and the short delay to minimize a dead time period the reply resides in the buffer prior to retrieval by the host.

4. The apparatus of claim 1, wherein the optimizing controller is further arranged track a dead time, the dead time indicative of how long the response resides at the multiplexer prior to communication to the host, and wherein the optimizing controller is arranged to vary at least one of the long delay and the short delay to minimize the dead time.

5. The apparatus of claim 4, wherein the optimizing controller is arranged to vary both the long delay and the short delay to minimize the dead time.

6. The apparatus of claim 1, wherein the first message and the plurality of subsequent messages are chosen from a message set, the message set including a plurality of possible messages, each message in the message set having unique message parameters, and wherein the host is arranged to select a chosen message from the message set, and further wherein the optimizing controller is arranged to assess the unique message parameters of the chosen message and to establish the bracket width and the long delay based on the unique message parameters of the chosen message.

7. The apparatus of claim 6, wherein the instrument device includes a communication characteristic, and wherein the optimizing controller is arranged assess the communication characteristic and to vary the long delay and the short delay based at least in part on the communication characteristic.

8. The apparatus of claim 1, wherein the first message and the plurality of subsequent messages are chosen from a message set, the message set including a plurality of possible messages for the instrument device, each message in the message set having unique message parameters, and wherein the host is arranged to select a chosen message from the message set, and further wherein the optimizing controller is arranged to assess the message turnaround time for each message on the message set and establish the bracket width based on the greatest message turnaround time in the message set.

9. The apparatus of claim 1, wherein the receipt of the response by the host defines a complete message cycle, and wherein the optimizing controller is arranged to run an optimization cycle, the optimization cycle defined by lengthening the long delay to reach an optimization eligible state, the optimization eligible state defined by completion of the communication cycle with no more than two subsequent messages, the optimization cycle comprising shortening the long delay until a fail point is reached, the fail point defined by the sending of a third subsequent message.

10. The apparatus of claim 9, wherein the optimizing controller is arranged to re-run the optimization cycle after the fail point is reached.

11. An apparatus for optimizing multiplexer communications comprising:
    a host;
    a multiplexer; and
    an instrument device;
    the host arranged to run a host software and to transmit a message to the multiplexer, the message including an embedded message for the instrument device, the host arranged to re-transmit the message until a response to the message is received from the multiplexer, a first re-transmission occurring after a long delay, a second and all subsequent re-transmissions occurring after a second time interval;
    the multiplexer arranged to strip the embedded message and to forward the embedded message to the instrument device, the multiplexer further arranged to indicate to the host whether the embedded message has been received and forwarded to the instrument device and whether the response has been received from the instrument device, the multiplexer further arranged to receive and store the reply until the reply is communicated to the host;

the instrument device arranged to receive and process the embedded message and to communicate the response to the multiplexer; and an optimizing controller, the optimizing controller arranged to:
  establish a count, the count indicating the number of re-transmissions occurring before the response has been communicated to the host;
  assess a message turnaround time, the message turnaround time based on the communication time it takes to transmit the message from the host to the multiplexer and to transmit the response from the multiplexer to the host;
  establish a bracket width, the bracket width at least as long as the message turnaround time;
  establish a short delay, the short delay based at least in part on the bracket width and the message turnaround time; and
  vary at least one of the long delay and the short delay to minimize the count.

12. The apparatus of claim 11, wherein the multiplexer includes a buffer arranged to store the reply until the response is communicated to the host, and wherein the optimizing controller is further arranged to vary at least one of the long delay and the short delay to minimize a dead time, the dead time indicative of how long the response resides in the buffer prior to communication to the host.

13. The apparatus of claim 12, wherein the optimizing controller is further arranged to vary both of the long delay and the short delay to minimize the dead time.

14. The apparatus of claim 11, wherein the time indicative of how long the response resides at the multiplexer prior to communication to the host is indicated by a dead time, and wherein the optimizing controller is arranged to vary the long delay and the short delay to minimize the dead time.

15. The apparatus of claim 11, wherein the optimizing controller is arranged to vary both the long delay and the short delay to minimize the count.

16. The apparatus of claim 11, wherein the first message and the plurality of subsequent messages are chosen from a message set, the message set including a plurality of possible messages, each message in the message set having unique message parameters, and wherein the host is arranged to select a chosen message from the message set, and further wherein the optimizing controller is arranged to assess the unique message parameters of the chosen message and to establish the bracket width and the long delay based on the unique message parameters of the chosen message.

17. The apparatus of claim 16, wherein the instrument device includes a communication characteristic, and wherein the optimizing controller is arranged assess the communication characteristic and to vary the long delay and the short delay based at least in part on the communication characteristic.

18. The apparatus of claim 11, wherein the first message and the plurality of subsequent messages are chosen from a message set, the message set including a plurality of possible messages for the instrument device, each message in the message set having unique message parameters, and wherein the host is arranged to select a chosen message from the message set, and further wherein the optimizing controller is arranged to assess the message turnaround time for each message on the message set and establish the bracket width based on the greatest message turnaround time in the message set.

19. The apparatus of claim 11, wherein the receipt of the response by the host defines a complete message cycle, and wherein the optimizing controller is arranged to run an optimization cycle, the optimization cycle defined by lengthening the long delay to reach an optimization eligible state, the optimization eligible state defined by completion of the communication cycle with no more than two subsequent messages, the optimization cycle comprising shortening the long delay until a fail point is reached, the fail point defined by the sending of a third subsequent message.

20. The apparatus of claim 19, wherein the optimizing controller is arranged to re-run the optimization cycle after the fail point is reached.

21. A method for optimizing communications between a host, a multiplexer, and a field instrument device comprising:
  providing a host controller;
  providing a multiplexer; and
  providing a field instrument device;
  providing a host software for the host controller, the host software arranged to transmit a message to the multiplexer, the message including an embedded message for the instrument device, the host arranged to re-transmit the message until a response to the message is received from the multiplexer, a first re-transmission occurring after a long delay, a second and all subsequent re-transmissions occurring after a second time interval;
  arranging the multiplexer to strip the embedded message and to forward the embedded message to the instrument device, the multiplexer further arranged to indicate to the host whether the embedded message has been received and forwarded to the instrument device and whether the response has been received from the instrument device;
  the instrument device arranged to receive and process the embedded message and to communicate the response to the multiplexer; and
  arranging the host controller to run an optimizing routine, the optimizing routine including:
    establishing a count, the count indicating the number of re-transmissions occurring before the response has been communicated to the host;
    assessing a message turnaround time, the message turnround time based on the communication time it takes to transmit the message from the host to the multiplexer and to transmit the response from the multiplexer to the host;
    establishing a bracket width, the bracket width at least as long as the message turnaround time;
    establishing a short delay based on the message turnaround time and the bracket width; and
    varying at least one of the long delay and the short delay to minimize the count.

22. The method of claim 21, including providing the multiplexer with a buffer arranged to store the reply until the response is communicated to the host, and arranging the host controller to vary at least one of the long delay and the short delay to minimize a dead time, the dead time indicative of how long the response resides in the buffer prior to communication to the host.

23. The method of claim 22, wherein the optimizing controller is further arranged to vary both of the long delay and the short delay to minimize the dead time.

24. The method of claim 21, wherein the time the response resides in the buffer before being retrieved by the host is indicated by a dead time, and wherein the optimizing controller is arranged to vary the long delay and the short delay to minimize the dead time.

25. The method of claim 21, wherein the optimizing controller is arranged to vary both the long delay and the short delay to minimize the count.

26. The method of claim 21, wherein the first message and the plurality of subsequent messages are chosen from a message set, the message set including a plurality of possible messages, each message in the message set having unique message parameters, and wherein the host is arranged to select a chosen message from the message set, and further wherein the optimizing controller is arranged to assess the unique message parameters of the chosen message and to establish the bracket width and the long delay based on the unique message parameters of the chosen message.

27. The method of claim 26, wherein the instrument device includes a communication characteristic, and wherein the optimizing controller is arranged assess the communication characteristic and to vary the long delay and the short delay based at least in part on the communication characteristic.

28. The method of claim 21, wherein the first message and the plurality of subsequent messages are chosen from a message set, the message set including a plurality of possible messages for the instrument device, each message in the message set having unique message parameters, and wherein the host is arranged to select a chosen message from the message set, and further wherein the optimizing controller is arranged to assess the message turnaround time for each message on the message set and establish the bracket width based on the greatest message turnaround time in the message set.

29. The method of claim 21, wherein the receipt of the response by the host defines a complete message cycle, and wherein the optimizing controller is arranged to run an optimization cycle, the optimization cycle defined by lengthening the long delay to reach an optimization eligible state, the optimization eligible state defined by completion of the communication cycle with no more than two subsequent messages, the optimization cycle comprising shortening the long delay until a fail point is reached, the fail point defined by the sending of a third subsequent message.

30. The method of claim 29, wherein the optimizing controller is arranged to re-run the optimization cycle after the fail point is reached.

31. The method of claim 29, wherein the optimizing controller re-runs the optimization cycle after the fail point is reached, and wherein the optimizing controller is arranged to increase the long delay by a time period equal to about 25% of the bracket width prior to re-running the optimization cycle.

32. The method of claim 29, including storing data unique to at least one of a particular message, a particular field device, and a particular multiplexer.

* * * * *

UNITED STATES PATENT AND TRADEMARK OFFICE
CERTIFICATE OF CORRECTION

| | | |
|---|---|---|
| PATENT NO. | : 7,054,337 B2 | Page 1 of 2 |
| APPLICATION NO. | : 10/099575 | |
| DATED | : May 30, 2006 | |
| INVENTOR(S) | : Alfred R. Jackson, III | |

It is certified that error appears in the above-identified patent and that said Letters Patent is hereby corrected as shown below:

<u>On the Title Page:</u>

At line (73), "LLC." should be -- LLC --.

<u>In the Drawings:</u>

At Sheet 8, Fig. 9, header, line 2, "QUEING" should be -- QUEUING --.

At Sheet 8, Fig. 9, box 62, line 2, "QUE" should be -- QUEUE --.

At Sheet 8, Fig. 9, box 64, line 2, "QUE" should be -- QUEUE --.

At Sheet 8, Fig. 9, box 94, line 3, "QUE" should be -- QUEUE --.

At Sheet 8, Fig. 9, box 66, line 2, "QUE" should be -- QUEUE --.

At Sheet 8, Fig. 9, box 72, line 2, "QUE" should be -- QUEUE --.

At Sheet 8, Fig. 9, box 76, line 3, "QUE" should be -- QUEUE --.

At Sheet 8, Fig. 9, box 74, line 3, "QUE" should be -- QUEUE --.

At Sheet 8, Fig. 9, box 70, line 2, "QUE" should be -- QUEUE --.

At Sheet 9, Fig. 10, box 94, line 3, "QUE" should be -- QUEUE --.

<u>In the Specification:</u>

At Column 4, line 51, "tin" should be -- in --.

At Column 11, lines 45-46, "turnround" should be -- turnaround --.

UNITED STATES PATENT AND TRADEMARK OFFICE
CERTIFICATE OF CORRECTION

| | | |
|---|---|---|
| PATENT NO. | : 7,054,337 B2 | |
| APPLICATION NO. | : 10/099575 | |
| DATED | : May 30, 2006 | |
| INVENTOR(S) | : Alfred R. Jackson, III | |

It is certified that error appears in the above-identified patent and that said Letters Patent is hereby corrected as shown below:

At Column 11, line 65, "arranged track" should be -- arranged to track --.

At Column 12, line 18, "arranged assess" should be -- arranged to assess --.

At Column 14, line 43, "turnround" should be -- turnaround --.

At Column 15, line 16, "arranged assess" should be -- arranged to assess --.

Signed and Sealed this

Second Day of December, 2008

JON W. DUDAS
*Director of the United States Patent and Trademark Office*